US012450993B2

(12) United States Patent
Deixler et al.

(10) Patent No.: US 12,450,993 B2
(45) Date of Patent: Oct. 21, 2025

(54) APPARATUS FOR CONTROLLING RADIOFREQUENCY SENSING

(71) Applicant: SIGNIFY HOLDING B.V., Eindhoven (NL)

(72) Inventors: Peter Deixler, Arlington, MA (US); Jin Yu, Lexington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/681,153

(22) PCT Filed: Jul. 28, 2022

(86) PCT No.: PCT/EP2022/071235
§ 371 (c)(1),
(2) Date: Feb. 5, 2024

(87) PCT Pub. No.: WO2023/012033
PCT Pub. Date: Feb. 9, 2023

(65) Prior Publication Data

US 2024/0282182 A1 Aug. 22, 2024

Related U.S. Application Data

(60) Provisional application No. 63/229,571, filed on Aug. 5, 2021.

(30) Foreign Application Priority Data

Aug. 13, 2021 (EP) .................................... 21191295

(51) Int. Cl.
*G08B 13/16* (2006.01)
*G08B 13/186* (2006.01)
*G08B 13/24* (2006.01)

(52) U.S. Cl.
CPC ..... *G08B 13/1645* (2013.01); *G08B 13/1672* (2013.01); *G08B 13/186* (2013.01); *G08B 13/2494* (2013.01)

(58) Field of Classification Search
CPC ............ G08B 13/1645; G08B 13/1672; G08B 13/186; G08B 13/2494; G08B 13/181; G08B 21/0492; G08B 29/188
See application file for complete search history.

(56) References Cited

U.S. PATENT DOCUMENTS

2018/0292523 A1* 10/2018 Orenstein ............ A61B 5/1113
2019/0214019 A1 7/2019 White et al.

(Continued)

FOREIGN PATENT DOCUMENTS

WO 2021013659 A1 1/2021
WO 2022148718 A1 7/2022

OTHER PUBLICATIONS

Wang, Anran, et al., "Contactless Infant Monitoring Using White Noise," University of Washington, ACM ISBN 978-1-4503-6169-9/19/10, MOBICOM, 2019 (16 Pages).

*Primary Examiner* — Davetta W Goins
*Assistant Examiner* — Sharmin Akhter

(57) ABSTRACT

The invention relates to an apparatus for controlling radiofrequency sensing and audio sensing of a network. The network (100) comprises a plurality of network devices (111, 112, 113, 114), e.g. smart lights, and is adapted to perform radiofrequency sensing and audio sensing utilizing one or more of the network devices. A context parameter providing unit (121) provides context parameters, wherein the context parameters are indicative of a context in which the radiofrequency sensing and the audio sensing is performed. A controlling unit (122) controls the radiofrequency sensing and the audio sensing of the network in dependency (Continued)

of each other based on the context parameters. This allows for an improved monitoring of an area.

13 Claims, 3 Drawing Sheets

(56) References Cited

U.S. PATENT DOCUMENTS

| | | | | |
|---|---|---|---|---|
| 2020/0383580 | A1 | 12/2020 | Shouldice et al. | |
| 2021/0035425 | A1 | 2/2021 | Eckert et al. | |
| 2021/0072378 | A1 | 3/2021 | Shin et al. | |
| 2021/0150873 | A1* | 5/2021 | Shouldice .............. | G08B 21/22 |
| 2023/0087854 | A1 | 3/2023 | Yu et al. | |

* cited by examiner

APPARATUS FOR CONTROLLING RADIOFREQUENCY SENSING

CROSS-REFERENCE TO PRIOR APPLICATIONS

This application is the U.S. National Phase application under 35 U.S.C. § 371 of International Application No. PCT/EP2022/071235, filed on Jul. 28, 2022, which claims the benefit of U.S. Provisional Patent Application No. 63/229,571, filed on Aug. 5, 2021 and European Patent Application Ser. No. 21/191,295.1, filed on Aug. 13, 2021. These applications are hereby incorporated by reference herein.

FIELD OF THE INVENTION

The invention relates to an apparatus, a network comprising the apparatus, a method and a computer program product for controlling radiofrequency sensing and audio sensing of a network.

BACKGROUND OF THE INVENTION

Today in many applications a monitoring of a predetermined area is desired, for instance, to determine a presence or absence of persons in the area, for security reasons or for controlling room functions like a lighting or air conditioning. Moreover, the monitoring of an area can be utilized in healthcare applications, for instance, when monitoring physiological parameters like breathing, or heartbeat. For these applications, for example, radiofrequency sensing can be utilized to monitor the area, wherein radiofrequency signals are used to derive respective parameters that are indicative for a respective sensing goal. However, although radiofrequency sensing allows for a very accurate detection, for instance, of the presence of people or of a breathing signal of a person, it can be very difficult to locate a person exactly within the area with this sensing modality. Alternatively, today also audio sensing is applied in which audio signals are utilized for monitoring purposes. However, audio sensing is often difficult to perform in noisy environments and in such environments often leads to unreliable detection results.

It would therefore be advantageous to provide a sensing system that allows for an improved monitoring of a sensing area.

US 2021/150873A1 discloses physiological movement detection, such as gesture, breathing, cardiac and/or gross body motion, with active sound generation such as for an interactive audio device. A processor may evaluate, via a microphone coupled to the interactive audio device, a sensed audible verbal communication. The processor may control producing, via a speaker coupled to the processor, a sound signal in a user's vicinity. The processor may control sensing, via a microphone coupled to the processor, a reflected sound signal. This reflected sound signal is a reflection of the generated sound signal from the vicinity or user. The processor may process the reflected sound, such as by a demodulation technique, to derive a physiological movement signal. The processor may generate, in response to the sensed audible verbal communication, an output based on an evaluation of the derived physiological movement signal.

SUMMARY OF THE INVENTION

It is an object of the present invention to provide an apparatus, a network comprising the apparatus, a method and a computer program product that allow for an improved monitoring of an area.

In a first aspect of the present invention, an apparatus for controlling radiofrequency sensing and audio sensing of a network is presented, wherein the network comprises a plurality of network devices, and wherein the network is adapted to perform radiofrequency sensing and audio sensing utilizing one or more of the network devices, wherein the apparatus comprises a) a context parameter providing unit for providing context parameters, wherein the context parameters are indicative of a context in which the radiofrequency sensing and the audio sensing is performed, and b) a controlling unit for controlling the radiofrequency sensing and the audio sensing of the network in dependency of each other based on the context parameters.

Since the apparatus is adapted to control a radiofrequency sensing and an audio sensing of a network in dependency of each other based on context parameters that are indicative of a context in which the radiofrequency sensing and the audio sensing are performed, depending on a current situation, for instance, a current monitoring goal and/or a current state of the to be monitored area the radiofrequency sensing and the audio sensing can be flexible adapted, i.e. controlled, to allow for an optimal monitoring. Moreover, since the controlling of the radiofrequency sensing and the audio sensing is performed in dependency of each other, i.e. since the current controlling status, for instance, in form of a current setting of the radiofrequency and audio sensing, is taken into account, the audio and radiofrequency sensing can be controlled to work together optimally, in order to reach a respective sensing goal in a current situation. Thus, the monitoring in a sensing area can be improved.

The apparatus is adapted to control a radiofrequency sensing and an audio sensing of a network, wherein the network comprises a plurality of network devices. Generally, the plurality of network devices refers to at least two network devices, more preferably to at least three network devices. The network is then formed by the network devices through a communication between the network devices. In particular, the network devices can utilize any known network communication protocol for communicating with each other and forming the network. Preferably, the network communication refers to a wireless network communication using radiofrequency signals and utilizing, for instance, a WiFi, ZigBee, Bluetooth, etc. network communication protocol. In an embodiment, the network can be or can be part of a lighting system, in which case at least some of the network devices can be lights which light output is controlled, for instance, based on the sensing result of the combined radiofrequency and audio sensing. However, the network devices can also refer to devices providing other functionalities then a light functionality. For instance, the network may be or maybe part of a smart home system, in which case the network devices can be smart home devices executing a function in a home or office of the user, for instance, based on the combination of radiofrequency sensing and audio sensing results.

The network is adapted to perform radiofrequency sensing and audio sensing utilizing one or more network devices. In particular, at least some of the network devices of the network are adapted to perform radiofrequency sensing and at least some of the network devices are adapted to perform audio sensing. Preferably, the same network devices that are adapted to perform radiofrequency sensing are also adapted to perform audio sensing. However, the network devices of the network performing the radiofrequency sensing and audio sensing can also be different from each other or only some of the network devices participating in the radiofrequency sensing and the audio sensing are adapted to perform both.

Generally, radiofrequency sensing is a sensing technique based on utilizing radiofrequency signals, for instance, network communication signals, that can interact with the environment of the network devices to determine changes and/or disturbances in the radiofrequency signals that can be interpreted in accordance with a predetermine sensing goal. Audio sensing can refer to active or passive audio sensing. Active audio sensing refers to at least one of the network devices participating in the audio sensing transmitting an audio signal that can, for instance, after an interaction with the environment of the network devices, be received by the network devices participating in the audio sensing. Based on the differences between the known sent audio signal and the received audio signal also changes and disturbances in the transmission path of the audio signal can be determined and can be utilized for deriving information with respect to a respective sensing goal. In contrast thereto in passive audio sensing an active transmission of an audio signal is omitted and the network devices participating in the audio sensing are adapted to receive audio signals that can be provided by any known noise source in the environment of the network, for instance, a person present in a room, a radio, a working fan, etc. In this case the original signal characteristics of the transmitted signal are not known. However, from the received audio signals, for instance, in combination with the predetermined baseline of audio signals in an environment, also information on changes and disturbances in the environment of the network devices can be derived and utilized for determining a sensing goal. In a preferred embodiment, the network is adapted to perform active radiofrequency sensing by controlling at least one of the network devices to emit an audio signal and to control the other network devices participating in the audio sensing to receive the audio signal after its interaction with the environment of the network devices. Thus, both sensing modalities, i.e. radiofrequency sensing and audio sensing, can be utilized for sensing changes in an environment of the sensing network. Since the radiofrequency sensing and the audio sensing of the network devices utilizes completely different signals, i.e. electromagnetic signals and air pressure changes, respectively, both sensing methods can be performed at the same time and generally without influencing each other.

The context parameter providing unit is adapted to provide context parameters, wherein the context parameters are indicative of a context in which the radiofrequency sensing and the audio sensing is performed. Generally, the context parameter providing unit can be a storage unit in which the context parameters are stored already. However, the context parameter providing unit can also be adapted as a context parameter receiving unit for receiving the context parameters, for instance, from an external storage unit, or directly from a device measuring the context parameters, and can be adapted to provide the received context parameters. Generally, the context of the radiofrequency sensing and the audio sensing can refer to any current sensing situation in which the radiofrequency sensing and the audio sensing is performed and can be represented by parameters that are indicative for the current situation. For example, a current constellation of objects in a sensing area can refer to a current context in which the radiofrequency sensing and audio sensing is performed in the area. In such a case, for instance, the context parameters can refer to the positions and/or orientation of the subjects in the area, wherein these parameters are indicative of the constellation of the subjects in the area.

Generally, the context parameters can refer to external network parameters and/or internal network parameters. External network parameters are indicative of a situation outside of the network itself, for instance, the constellation of subjects in a sensing area as described in the example above. The internal network parameters are indicative of the situation of the network and/or the network devices performing the radiofrequency sensing and/or the audio sensing. For example, internal network parameters can refer to a current state or setting of one or more of the network devices, like a current sensing frequency range, a possible provided functionality, a general transmission range, etc. Preferably, the context parameters are indicative of a current sensing situation referring to at least one of a frequency dependent transmission range of audio and/or radiofrequency signals of one or more network devices, a spatial confinement of the audio and/or radiofrequency signals, at least one physical dimension of a to be sensed subject, a possible and/or allowable radiofrequency and/or audio frequency range provided by one or more of the network devices, and current or expected presence, absence or constellation of one or more subjects in a sensing area of the network.

The context parameters can be measured, for example, during a setup and configuration of the network. Moreover, the context parameters can also be derived from currently performed radiofrequency sensing and/or audio sensing of the network, for instance, can refer to a result of the radiofrequency sensing and/or the audio sensing of the network. Further, the context parameters can also be derived from an input of a user, for instance, the context parameter providing unit can be adapted to prompt a user to measure and input a physical dimension of a to be sensed subject or the positions of one or more subjects in the environment of the sensing area. Moreover, images or LIDAR measurements of an environment can be utilized for deriving, for instance, a current setting of the sensing area and/or materials of subjects in the current setting as context parameters. Further, the context parameters can also be derived from a knowledge on internal settings or a status of one or more of the network devices, for instance, by communicating with the network devices and requesting according information. Also a manual or information provided by a manufacturer on a network device can be utilized to derive context parameters. Such determined context parameters can then be provided by the context providing unit to the controlling unit.

The controlling unit is adapted to control the radiofrequency sensing and the audio sensing of the network in dependency of each other based on the context parameters. Generally, a controlling of a sensing modality refers to causing a change or amendment in sensing parameters of the respective sensing modality. A sensing parameter can refer in this context to any parameter that can be set in one or more of the network devices that has an influence on the respective sensing modality, for example, a frequency of received/transmitted sensing signals, a used sensing algorithm, a preprocessing of received sensing signals, etc. In particular, the controlling of the radiofrequency and the audio sensing performed in dependency of each other refers to a controlling based on functional relations between changes in sensing parameters of the different sensing modalities, e.g., the audio sensing, the radiofrequency sensing etc. Thus, the radiofrequency sensing and the audio sensing are not performed independent of each other. For example, if sensing parameters of the radiofrequency sensing are changed, this change can also directly lead to a change of sensing parameters of the audio sensing of the network, for example, due to respective functional relations between the sensing parameters of the different sensing modalities. This controlling of the radiofrequency sensing and the audio sensing in dependency of each other is based on the context parameters. For example, predefined sensing situations and the respective corresponding context parameters can be stored together with instructions indicating how the radiofrequency sensing and the audio sensing should be controlled in dependency of each other when the respective context parameters indicated predetermined sensing situation. The controlling unit can then be adapted to access the storage on which this information is stored and can then be based on the context parameters select a respective controlling strategy comprising the instructions that is then implemented for controlling the radiofrequency sensing and the audio sensing of the network. For example, such an instruction can comprise functional relations between the sensing modalities and cause, for instance, a synchronization of certain sensing parameters of the audio sensing and the radiofrequency sensing if a certain predetermined sensing situation is indicated by the context parameters.

Preferably, the controlling unit is adapted to apply predetermined instructions that define a specific orchestration of the radiofrequency sensing and the audio sensing of the network based on the context parameters, wherein the specific orchestration refers to a specific controlling of sensing parameters utilized for the radiofrequency sensing and the audio sensing of the network in dependency of each other. In particular, an orchestration refers to the application of interrelated instructions with respect to the radiofrequency sensing and the audio sensing. Such interrelated instructions indicate, for instance, a controlling relationship between certain sensing parameters of the radiofrequency sensing and the audio sensing such that when one of these sensing parameters is changed or adapted also the respective related sensing parameter is also changed or adapted according to the controlling relationship. The sensing parameters can refer to any parameters that are utilized for the radiofrequency sensing and/or the audio sensing, respectively. For example, a sensing parameter can refer to a respective sensing algorithm utilized for the radiofrequency sensing or the audio sensing, or to a setting of the respective sensing algorithm in the radiofrequency sensing or the audio sensing, respectively. Moreover, the sensing parameters can also refer to the settings of the network devices that perform the radiofrequency sensing and/or the audio sensing with respect to the transmitted or received radiofrequency and/or audio sensing signals, respectively. For example, a sensing parameter can refer to the frequency or frequency range of transmitted radiofrequency signals or audio signals. Also other direct signal characteristics, like a signal strength, a signal amplitude, a signal transmission range, etc. can be a sensing parameter that can be controlled during the orchestration of the radiofrequency sensing and the audio sensing.

In a preferred embodiment, the instructions include as specific orchestration adapting the wavelength of audio signals utilized for the audio sensing to be similar to the wavelength of the radiofrequency signals utilized for radiofrequency sensing, when the context parameters indicate a predetermined current sensing situation that requires an increase of the sensing accuracy. In particular, current sensing situations that require an increase of the sensing accuracy can be defined, for instance, by a user when configuring the network in accordance with sensing situations that are expected during the respective application of the sensing capabilities of the network. However, such current sensing situations that require an increase of the sensing accuracy can also be predefined by a manufacturer in a general sensing application context. For example, a respective sensing situation in which an increase of the sensing accuracy is required can refer to a situation that indicates that a fall of a person might have happened. For instance, the context parameters in this case that indicate such a sensing situation can refer to detection results of the radiofrequency sensing and/or the audio sensing that indicate the fall of a person. However, the context parameters in this case can also refer to the results of a camera monitoring or the results of an acceleration measurement of a device worn by the person that are provided by the context parameter providing unit. In these cases an increase of the sensing accuracy allows to determine whether indeed the fall has occurred and if it might be necessary for the system to issue an alarm, for instance, for help or an emergency call. Another example for a sensing situation that requires an increase of the sensing accuracy is if a person that should be monitored changes from a very active state that is easy to monitor to a less active state, for instance, to a sleeping state, in which the monitoring of a person, due to the low activity during sleeping, requires an increase in the sensing accuracy. However, such sensing situations that require an increase of the sensing accuracy can also be independent of the monitoring of living beings like persons and can, for instance, also refer to more general sensing situations, like security applications in which it is required that unwanted activities in a region, for instance, a burglary or trespassing are very accurately monitored during certain times of the day whereas in other times of the day, for instance, at day due to the presence of a plurality of people, an accurate monitoring is not desired. Thus, in this example the context parameters can refer to the time of day and when the time of the day indicates, for instance, a closing time of a shop, this current sensing situation of the closed shop might require an increase of the sensing accuracy to detect the unwanted activities. Since a specific orchestration for the above mentioned cases refers to adapting the wavelengths of the audio signals utilized for the audio sensing to be similar to the wavelength of the radiofrequency signals utilized for the radiofrequency sensing, it becomes possible for both sensing modalities to monitor the same subjects such that respective sensing results of one sensing modality can be reviewed and verified based on the results of the respective other sensing modality. Moreover, it becomes less likely that an important event is not sensed by at least one of the sensing modalities.

In a preferred embodiment, the instructions include a specific orchestration adapting the wavelength of audio signals utilized for the audio sensing to be different from the wavelength of the radiofrequency signals utilized for radiofrequency sensing, when the context parameters indicate a predetermined current sensing situation that requires an increase in the sensing diversity. Also, as already explained above, in this case the respective current sensing situations that require an increase in the sensing diversity can be predetermined by a user or can be predefined by a manufacturer. Such situations can for instance, refer to situations in which subjects with very different characteristics should be monitored at the same time, for instance, if at the same time a vehicle and a person should be monitored, for instance, in a logistic environment, or if the monitoring of a sleeping child in one corner of the room is desired at the same time with a monitoring of a grown up in another part of the room, etc. In such cases the adapting of the wavelength of the audio signals utilized for audio sensing to be different form the wavelength of the radiofrequency signals increases the accuracy in monitoring the different subjects since the signals with different wavelengths will interact differently with the different subjects.

In a further preferred embodiment, the instructions include as specific orchestration coordinating a wavelength hopping of audio signals utilized for the audio sensing with a wavelength hopping of the radiofrequency signals utilized for radiofrequency sensing, when the context parameters indicate a predetermined current sensing situation with an environmental audio and/or radiofrequency noise above a predetermined threshold and/or when the context parameters indicate a predetermined current sensing situation that requires an increase of the sensing accuracy. Generally, a wavelength hopping refers to a periodical change of the sensing wavelengths, i.e. of the wavelength range of the transmitted signals that are utilized for a sensing. For example, a wavelength hopping can refer to transmitting a signal, i.e. a radiofrequency or audio signal, respectively, with a first wavelength during a first time period and then "hopping" to a second wavelength during a next time period and then again hopping to the first wavelength, etc. Of course, also more than two wavelengths or wavelength ranges can also be utilized during such a hopping circle. Coordinating the wavelength hopping performed by the audio sensing and performed by the radiofrequency sensing allows to defined specific combinations of audio sensing and radiofrequency sensing that can be advantageous in different sensing situations. In particular, it is preferred that the coordination of the wavelength hopping refers to a synchronization of the wavelength hopping of audio signals utilized for the audio sensing with the wavelength hopping of the radiofrequency signals utilized for radiofrequency sensing in the time domain. In particular, in noisy environments and in sensing situations that require an increase of the sensing accuracy a synchronization of the wavelength hopping allows to monitor at the sensing area at all times with a clearly orchestrated wavelength of the radiofrequency and audio sensing. In particular, the synchronization of the wavelength hopping can be combined with any of the above embodiments referring to utilizing the same or different wavelengths or wavelength ranges for the audio sensing and the radiofrequency sensing.

However, in an embodiment the coordination of the wavelength hopping can also refer to providing a predetermined delay to the wavelength hopping of the audio signals utilized for audio sensing with respect to the wavelength hopping of the radiofrequency signals utilized for a radiofrequency sensing in the time domain. Preferably, this predetermined delay can refer to a time a respective utilized radiofrequency sensing algorithm needs to establish the radiofrequency sensing in the sensing area, for example, this time can refer to 0.5 seconds. Thus, during the time the radiofrequency sensing needs for establishing again an accurate sensing the audio sensing can be used to ensure a continuous monitoring of the sensing area and only perform the next wavelength hopping after the radiofrequency sensing and thus monitoring of the sensing area is again ensured.

In an embodiment, the specific orchestration can further include coordinating a beam steering of the audio signals utilized for the audio sensing with a beam steering of the radiofrequency signals utilized for radiofrequency sensing such that both the radiofrequency sensing and the audio sensing is performed with respect to the same sensing area at the same time. In particular, a beam steering refers to selecting a transmitting direction and/or the receiving direction of signals utilized for a radiofrequency or audio sensing, respectively, such that only a specific sub part of a potential sensing area is monitored at a time. This specific form of orchestration can be combined with any of the above described embodiments, for instance, in order to further facilitate the respective sensing goal in a predetermined sensing situation.

In an embodiment, the instructions include as specific orchestration performing audio sensing with a higher spatial resolution than the radiofrequency sensing, when the context parameters indicate an occurrence of a fall in the context of a fall detection or when the context parameters indicate an occurrence of a gesture in the context of a gesture detection. In this specific embodiment fall detection can be facilitated not only by simply combining the audio sensing with the radiofrequency sensing but by specifically orchestrating the radiofrequency sensing and the audio sensing such that when a potential fall has occurred in the sensing area, the audio sensing is performed with a higher spatial resolution than the radiofrequency sensing. Since the audio sensing allows for a better localization of events in a sensing area the higher resolution of the audio sensing allows for a more specific assessment of the situation, whereas the radiofrequency sensing can, for instance, be used during the time even with a lower resolution for monitoring, for instance, health parameters. Moreover, also in the context of the gesture detection an orchestration of the radiofrequency sensing and the audio sensing can be performed. For example, also in this case the radiofrequency sensing can be used to determine a general location at which a gesture can occur, for instance, by locating a person in a room, and the audio sensing can then be utilized based on the determined location to perform a more accurate sensing of the occurring gesture.

In an embodiment, the controlling of the audio sensing comprises filtering out parts of the audio sensing signal based on the context parameters, wherein the audio sensing is performed based on the filtered audio sensing signals. Preferably, the context parameters in this case refer to spatial context parameters, in particular, to context parameters that indicate a specific location in the sensing area for which the audio sensing signals should not be utilized during the audio sensing. For example, the context parameters can in this case be indicative of a position of a noise source, like a fan or a continuously working machine, in a sensing area. In this case parts of the audio sensing signal referring to the location of the noise source can be filtered out, for instance, by utilizing a time of flight technique for determining in which area a received audio signal has probably interacted. Further, other localization techniques for determining parts of an audio signal coming from a specific area like for instance Doppler localization techniques in case of moving objects, can be applied to determine the parts of the audio signal that are to be filtered out. This allows for an increase of the sensing accuracy of the audio sensing. In particular, this embodiment can be combined with any of the above described orchestration embodiments.

In an embodiment, the controlling comprises assigning the radiofrequency sensing and the audio sensing to different sensing tasks based on the context parameters and adapting the radiofrequency sensing and the audio sensing to the respective assigned tasks. In some applications it might be desired that more than one sensing task is performed by the sensing network, for instance, it might be desired that the presence or absence of persons in a room is monitored while at the same time monitoring the opening and closing of a door or window in the room. In this case based on the context parameters, for instance, based on a known size of desired monitoring subjects, the capabilities of the network devices, information on materials on the surface of the to be monitored subjects, etc. the controlling unit can be adapted to control the radiofrequency and the audio sensing such that the radiofrequency sensing and the audio sensing are assigned to the respective different sensing tasks, for instance, based on which of the sensing modalities is more suitable for the respective sensing task. Such a suitability can be determined, for instance, based on a stored relationship between respective sensing tasks and respective sensing modalities, for instance, as provided by a manufacturer. However, also input of a user can be utilized such that the sensing tasks are assigned in accordance with the wishes of the user. Moreover, in some embodiments, the context parameter can indicate, for instance, that different to be monitored subject are located in different areas. Thus, in an embodiment, the controlling comprises assigning the radiofrequency sensing and the audio sensing to different parts of a sensing area based on the context parameters and adapting the radiofrequency sensing and the audio sensing to perform the respective sensing in the assigned part.

In a further aspect of the present invention, a network is presented, wherein the network comprises a) a plurality of network devices adapted to enable the network to perform radiofrequency sensing and audio sensing in a sensing area concurrently, and b) an apparatus according to any of the preceding claims.

In a further aspect of the present invention, a method for controlling radiofrequency sensing and audio sensing of a network is presented, wherein the network comprises a plurality of network devices, and wherein the network is adapted to perform radiofrequency sensing and audio sensing utilizing one or more of the network devices, wherein the method comprises a) providing context parameters, wherein the context parameters are indicative of a context in which the radiofrequency sensing and the audio sensing is performed, and b) controlling the radiofrequency sensing and the audio sensing of the network in dependency of each other based on the context parameters.

In a further aspect of the present invention a computer program product for controlling radiofrequency sensing and audio sensing of a network is presented, wherein the computer program product is adapted to cause an apparatus as described above to perform a method as described above when run on the apparatus.

It shall be understood that the apparatus as described above, the network as described above, the method as described above and the computer program product as described above have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
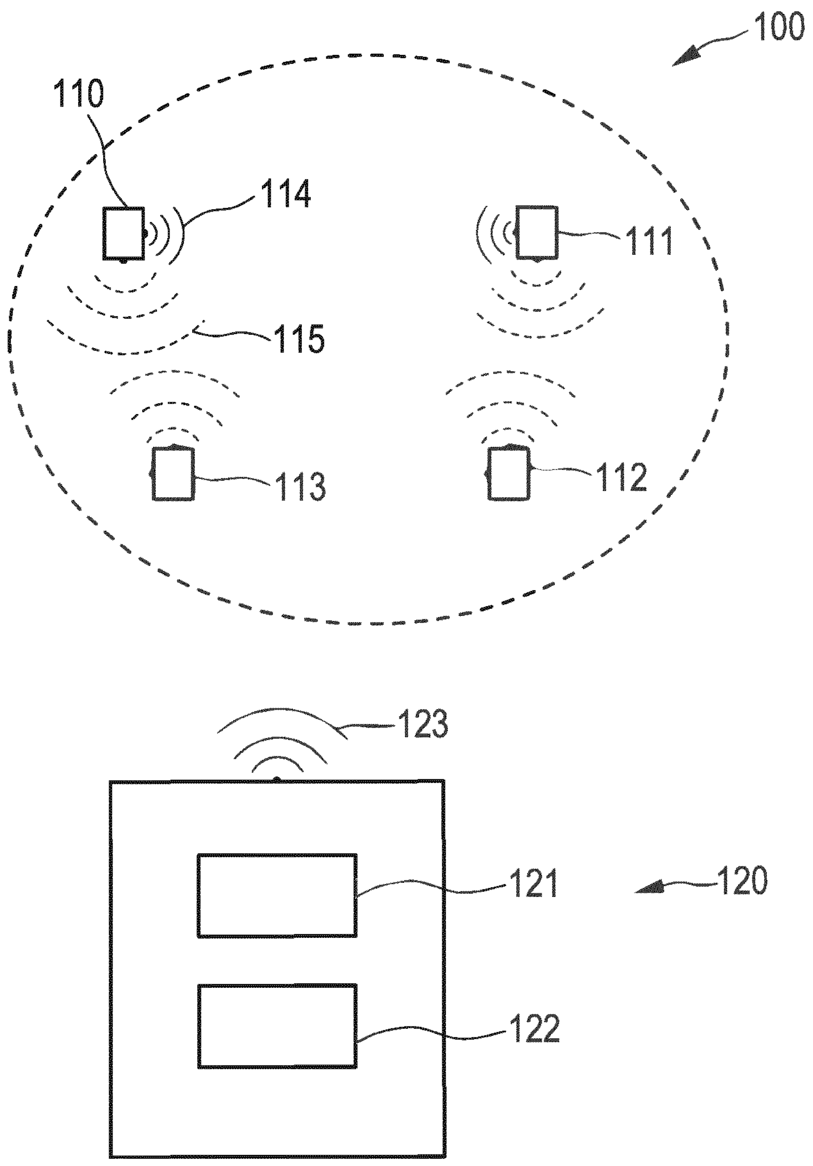
FIG. 1 shows schematically and exemplarily an embodiment of a network comprising an apparatus for controlling a radiofrequency sensing and an audio sensing of the network.

FIG. 1 shows schematically and exemplarily a network 100 comprising in this embodiment an apparatus 120 for controlling radiofrequency sensing and audio sensing of the network 100. The network 100 comprises network devices 110, 111, 112, 113 forming the network 100. The network 100 formed by the network devices 110, 111, 112, 113 can be formed by any known wired or wireless network communication protocol, for instance, ZigBee, WiFi, Bluetooth, etc.

The network devices 110, 111, 112, 113 are in this example all adapted to transmit and receive radiofrequency signals 114 and audio signals 115 for performing radiofrequency and audio sensing. Examples, for more details on how to perform generally radiofrequency sensing can be found, for instance, in the book "Wireless AI: Wireless Sensing, Positioning, IoT and Communications" by K. J. R. Liu et al., Cambridge University Press, 2019. Examples, for more details on how to perform general audio sensing can be found, for instance, in the article "Contactless Infant Monitoring using White Noise" by A-Wang et al., The 25th Annual International Conference on Mobile Computing and Networking (MobiCom '19), article 52, pages 1 to 16 (2019) or in the article "AIM: Acoustic Imaging on a Mobile" by W. Mao et al., MobiSys '18: Proceedings of the 16$^{th}$ Annual International Conference on Mobile Systems, Applications, and Services, pages 468 to 481 (2018). However, in other embodiments also only a part of the network devices can be adapted to transmit and/or receive radiofrequency signals 114 or audio signals 115. Preferably, at least some of the network devices 110, 111, 112, 113 further provide a lighting functionality and can thus be regarded as smart lights in a smart home environment.

In this example, the network 100 comprises further the apparatus 120, wherein the apparatus 120 comprises a context parameter providing unit 121 and a controlling unit 122. The apparatus 120 is adapted to control the radiofrequency sensing and the audio sensing of the network 100. For example, the apparatus 120 can be in a wired or wireless communication 123 with one or more of the network devices 110, 111, 112, 113. However, the apparatus 120 can also be realized as an integral part of one or more of the network devices 110, 111, 112, 113, wherein in this case the apparatus 120 can be realized, for instance, as general or dedicated hard—and/or software on one or more of the network devices 110, 111, 112, 113. Moreover, the apparatus 120 can also refer to software running on a dedicated or general computing structure, for instance, a personal computer, a smartphone, a cloud, etc. For example, if the apparatus 120 is realized as being part of a cloud the apparatus 120 can be adapted to communicate indirectly with one or more of the network devices 110, 111, 112, 113, for instance, via a respective application provided on a device being in communication with the network.

The context parameter providing unit 121 is adapted for providing context parameters. The context parameters are generally indicative of a context in which the radiofrequency sensing and the audio sensing of the network is performed. For example, the context parameters can refer to an environment in which the radiofrequency sensing and the audio sensing is performed, wherein in this case the context parameters refer to external network parameters. In this case the context parameters can refer, for instance, to a physical dimension of a to be sensed or monitored subject, a position and/or characteristic of a confinement of the radiofrequency and/or audio sensing of the network, a position and/or characteristic of different subjects, like furniture in a sensing environment of the network 100, etc. Such external network parameters can be provided, for instance, by an input of a user during a configuration of the network 100. However, such external network parameters can also be a result of a measurement in the environment of the network 100. Such a measurement can be performed, for instance, by a camera, a LIDAR or any other measurement device that allows to provide indications on the environment of the network 100. In a preferred embodiment at least some of the external network parameters are derived from results of the radiofrequency and/or audio sensing itself. The context parameters can, however, also refer to internal network parameters indicative of an internal situation of the network and/or the network devices of the network 100. Such internal network parameters can refer, for instance, to general possible and/or allowable radiofrequency and/or audio frequency ranges provided by one or more of the network devices, to generally provided functionalities of the network devices, to a position of one or more network devices with respect to each other, etc. Moreover, the internal network parameters can also refer to a current sensing situation, and then be indicative of a current setting of the network devices, for instance, to currently utilized radiofrequency or audio sensing parameters, to a current status of one or more of the network devices, for instance, whether they are in a sleep state, in a awake state, in a sensing state, etc. Generally, it is preferred that the context parameters independent on whether they refer to external or internal network parameters, are indicative of a current sensing situation of the network 100, i.e. refer to a current state of the environment and/or internal working of the network. In particular, in this case it is preferred that the current sensing situation is derived from results of the radiofrequency and/or audio sensing of the network itself.

Based on their nature, the context parameters can be, for instance, stored on a storage device to which the context parameter providing unit 121 has access for providing the respective context parameters. However, if the context parameters are directly measured and refer to a current situation, i.e. to a current measurement, a context parameter providing unit 121 can also be adapted to receive these context parameters in real time, for instance, during a direct communication with the respective sensing device or during an indirect communication with the respective sensing device.

The controlling unit 122 is adapted to control the radiofrequency sensing and the audio sensing of the network in dependency of each other based on the context parameters. For example, the controlling unit is adapted to apply predetermined instructions that define a specific orchestration of the radiofrequency sensing and the audio sensing. In this case, predetermined instructions can be stored on a storage unit together with the respective context parameters which indicate a respective current sensing situation in which the predetermined instructions should be applied. Thus, the controlling unit 122 can be adapted to determine based on the context parameters directly or based on the current sensing situation derived from the context parameters which predetermined instructions should be applied. The predetermined instructions can be predetermined by a user, for instance, based on experience, knowledge on the respective situation that could be applied, based in respective sensing goals, etc. However, the predetermined instructions can also be provided by a manufacturer or by a professional based on general knowledge of optimal instructions in commonly occurring sensing situations. Generally, the controlling unit 112 is adapted to control the radiofrequency sensing and the audio sensing of the network in dependency of each other, in particular, to orchestrate the radiofrequency sensing and the audio sensing. Such an orchestration refers to taking into account during the controlling of one of the sensing modalities a current controlling of the respective other sensing modality. For example, if the controlling refers to an amending of sensing parameters of the radiofrequency sensing current or also amended sensing parameters of the audio sensing are taken into account. Thus, the radiofrequency sensing and the audio sensing are not performed independent of each other.

Figure 2:
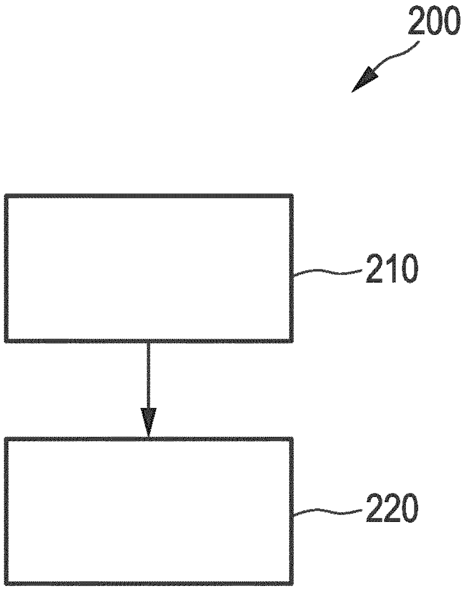
FIG. 2 shows schematically and exemplarily an embodiment of a method for controlling a radiofrequency sensing and an audio sensing of the network.

FIG. 2 shows schematically and exemplarily a method 200 for controlling radiofrequency sensing and audio sensing of a network, for instance, a network 100. The method 200 comprises a step 210 of providing context parameters that are indicative of a context in which the radiofrequency sensing and the audio sensing is performed. For example, the context parameters can be provided as already described above with respect to the context parameters providing unit 121. Further, the method 200 comprises a step 220 of controlling the radiofrequency sensing and the audio sensing of the network in dependency of each other based on the context parameters. This controlling can be performed, for example, as described above and also in the following more detailed embodiments with respect to the controlling unit 122.

In the following more detailed embodiments will be described, for instance, with respect to preferred combinations of sensing situations and respectively preferred predetermined instructions for the orchestration of the radiofrequency sensing and the audio sensing of the network.

Generally, occupancy detection and activity-tracking can be performed with active sound sensing, for instance, sound sensing utilizing Amazon Alexa device hardware performing both the transmission and reception functions required by the active audio sensing. Also WiFi-based or ZigBee-based radiofrequency sensing achieves a good presence detection performance but lacks the capability to locate people accurately. On the other hand, audio sensing is capable to locate people very well, mainly due to its ability to widely vary the audio wavelength. For example even with commonly available commodity speaker/microphone hardware the available audio wavelength ranges from 1.7 cm at 20 KHz audio to 1700 cm at 20 Hz. However, audio sensing is relatively easily adversely affected by noise in the environment, e.g. HVAC noise. Additionally, as most of the audio wavelengths available from the commodity speakers/microphone hardware are within the human-audible regime, this imposes application constraints on the wavelength choice. For instance, the current context of the room will determine which specific subset of the available audio sensing frequencies are regarded currently acceptable to the end user.

In this context, the inventors have found that the fusion of radiofrequency sensing and passive audio sensing can provide an efficient and affordable way, for instance, to detect the presence of persons in a room, to track persons in a building, to monitor breathing and/or daily activities, to detect fall accidents, etc.

Generally, sound waves and radiofrequency signals are fundamentally different. Sound waves are longitudinal compression waves of the air, while electromagnetic waves are transverse waves made up of electric and magnetic fields. Nevertheless, there are also some similarities between wireless and acoustical wavelengths, for instance, which subset of wavelengths, as compared to a certain physical object size, will interact strongly with the object itself or diffract around an edge of an object. How audio and radiofrequency signals propagate across a room is not just affected by a room's layout but also, for instance, by building materials and the chosen radio/audio frequency. For example, detailed measurements of wireless radiofrequency attenuation for various building materials and showcases how in practice the building materials used within the specific building space strongly determine how uniform the radio waves "fill up" the room are readily available. Moreover, besides the construction form of the room itself, also the "clutter" inside the room, such as furniture, and people can interact with the wireless waves, for instance, it is generally recommended to model this clutter as scatter sources even at 2.4 GHz radio frequencies. Further, also for audio waves the sound-wave propagation is affected by the construction form and building materials in the room. For instance, the Sound Transmission Class, or STC of a wall describes the difference in magnitude between the incident audio sound wave and the transmitted sound wave. For instance, a sustaining wall in a house or office has an STC of 33, meaning that it can attenuate 33 dB from one side of the wall to the other. While in general the signal attenuation of a 2.4 GHz wireless radiofrequency signals by building materials is often considerably less than audio sensing, there are in praxis many exceptions, such as for metal-coated glass surfaces often used in commercial buildings. In addition, unlike for sound, the wireless radiofrequency signal attenuation of a dividing wall will disproportionally increase with higher WiFi frequencies. For audio applications, often a Noise Reduction Coefficient metric, or NRC is utilized which describes for a certain building material the fractional ratio between the reflected sound wave and the incident sound wave. The NRC varies widely from room to room, e.g. smooth concrete surface reflects most sound energy, while a sound absorbing felt-covered surface has almost perfect absorption and hence will hinder a multipath audio sensing signal propagation in the room. For example, it is well known that an acoustical designer may deliberately add diffusion elements, e.g. a rough brick wall, to a building space, e.g. when creating a home theatre for an audiophile customer. The added sound diffusion elements prevent for specific audio frequencies the formation of unwanted audio standing waves in the home theatre. However, unlike in the millionaire's home theatre, normal rooms, e.g. an office conference room, typically may have many smooth surfaces such as glass, smooth walls, stone floors, etc., which are known to create more echoes and reflections and thereby create standing audio waves in the room which are diametral to audio sensing. As a room with all-absorptive surfaces is not a going to be a good-sounding room, even a high-end home theatre will use a balance of diffusion and absorption to achieve a good audio environment. Reflection of audio sensing sound waves off surfaces in the room can also lead to reverberation, i.e. unwanted prolonging of a sound in human perception. Prior art teaches that reverberation occurs in a small room with height, width, and length dimensions of approximately 17 meters or less. This is due to the human brain keeping a sound in memory for up to 0.1 seconds, hence if a reflected, sufficient sound wave reaches the ear within 0.1 seconds of the initial sound, it causes reverberation, consequently, the sound sensing pings become more pronounced and annoying to the human ear. Audio waves also interact with physical objects via diffraction, i.e. change in propagation direction of waves as they pass through an opening or around a barrier in their path. Diffraction enables the sound wave to travel around corners, around obstacles and through openings. The amount of diffraction, i.e. the sharpness of the bending around an object/opening, is dependent on the chosen audio wavelength. Diffraction effects are known to increase with increasing audio wavelength. If the wavelength becomes smaller than the obstacle or opening, no noticeable diffraction of the audio waves occurs. Audio waves also experience refraction effects, i.e. the bending of the path of the waves. Audio waves, being longitudinal waves physically interacting with matter, are known to get much stronger refracted than wireless waves, for instance when the waves move through different layers of air with gradually varying temperatures. The most well-known example for refraction is sound waves traveling over water, since water has a moderating effect upon the temperature of air, the air directly above the water tends to be cooler than the air far above the water. Sound waves travel slower in cooler air than they do in warmer air. For this reason, the portion of the wavefront directly above the water is slowed down, while the portion of the wavefronts far above the water speeds ahead. Subsequently, the direction of the sound travelling over the water changes, refracting downwards towards the water. In audio sensing, certain environments such as industrial facilities, e.g. food processing, will have temperature gradients between a first zone and a second zone serving different tasks, e.g. cooking vs preparing.

Based on the above described background the invention as already described above can utilize, for instance, already existing microphone sensors as well as the ZigBee radios to provide an orchestrated hybrid audio- and sound-sensing solution, for instance, for a richer activity tracking or fall detection. A simple audio speaker can be utilized for the audio sensing, for instance, as standalone network device or embedded into a network device with another functionality, like a light controller, a wall switch or a fixture such as a downlight with Amazon Alexa.

Moreover, based on the above background, it is clear that for wireless waves generally the shape of a room, its building materials, its environmental parameters and the size of objects present in the room can determine an optimal audio wavelength choice for audio sensing and an optimal wireless radiofrequency signal wavelength choice for radiofrequency sensing. Further, the maximum obtainable sensing performance of the hybrid sensing system for a chosen combination of a first audio-sensing wavelength and a second radiofrequency-sensing-wavelength can be determined, for instance, based on the above parameter. Hence, in practice a first room, e.g. living room, may be a suitable acoustic environment for a first combined set of audio and radiofrequency-sensing "sister" wavelengths, while a second room, e.g. kitchen, may require a different combined set of wavelengths. Additionally, of course also the expected to-be-detected activities can be taken into account when selecting the respective sensing wavelengths.

Compared to radiofrequency sensing, audio sensing is vastly more versatile. Unlike radiofrequency sensing, when utilizing audio sensing already the most basic audio-sensing system using only a standard low cost microphone and speaker hardware allows to vary the audio sensing wavelength over a wide range from 1.7 cm up to 17 m, i.e. from 20 KHz to 20 Hz, hence audio sensing is well-equipped for dynamic-frequency sensing, while radiofrequency sensing is generally ill-equipped for wide-range dynamic-frequency sensing as very expensive hardware will be needed to vary the wireless carrier frequency over a wide range of frequencies. Audio sensing allows for both short wavelengths comparable to WiFi, e.g. 2.5 cm, as well as providing extremely long wavelengths well beyond the ability of a commodity wireless radio, for instance, it is easily possible for audio sensing to generate even a wavelength similar to the torso size of the to be tracked person, hence maximizing the interaction of the audio waves with the torso. On the other hand, if, for instance, such a 70 cm wavelength should be generated with an wireless radio, the associated 400 MHz wireless frequency would require a very different radiofrequency front-end than current commonly utilized 2.4 GHz-only commodity WiFi/Zigbee radios. In an example, the similar wavelength may comprise wavelengths having the same order of magnitude, and wherein the different wavelength may comprise wavelengths having a different order of magnitude. Additionally, or alternatively, similar wavelength may refer to be similar if the difference between the wavelengths, e.g., wavelengths of the audio and radiofrequency signals does not exceeds a threshold, and wherein different wavelength may refer to be different if the difference between the wavelengths, e.g., wavelengths of the audio and radiofrequency signals exceeds a threshold.

In this context, the invention, as for instance described with respect to FIG. 1, describes a highly orchestrated hybrid sensing possibility that can utilize embedded microphone sensors/audio-speakers as well as radiofrequency sensing transceivers, whereas both the audio- and radiofrequency-sensing module can be embedded within network devices being preferably luminaires. In particular, it is preferred that the sensing of both modalities is controlled to operate simultaneously in a highly orchestrated fashion.

For example, ZigBee-based or WiFi-based radiofrequency sensing achieves a good presence detection performance but can at a given moment be prone to wireless interference in a certain wireless wavelength regime, e.g. disturbances due to 5 GHz video streaming or actuation of a 2.4 GHz microwave oven. For instance, if the radiofrequency sensing may be forced by the disturbances to switch to 2.4 GHz instead of 6 GHz WiFi, the new longer wireless wavelength will result in a loss of the capability to precision-locate the people. On the other hand, audio sensing has been shown to be capable to locate people well, mainly due to its ability to widely vary the audio wavelength. Even with commodity audio speaker/microphone hardware, the available audio wavelengths range from 1.7 cm for a 20 KHz audio tone to 1700 cm for a 20 Hz tone. However, audio sensing can be adversely affected by ambient audio noise in the environment. Hence if at a given moment a certain ambient-noise disturbance starts to occur, it immediately renders certain audio wavelengths useless for audio sensing purposes. As audio noise in real life environment is mostly below 10 kHz, especially lower audio sensing frequencies are affected by ambient audio noise. The presence of environmental audio noise may hence limit the available bandwidth of the audio sensing system and consequently its sensing performance. Additionally, many of the audio frequencies utilized by prior-art audio-sensing systems are within the human-audible regime. This imposes "real-time" application constraints on which subset of audio wavelengths are at a given moment acceptable to be used for audio sensing depending on the context in the room.

The inventors have in this context recognize that radiofrequency signals and audio signals have different propagation mechanisms and are subject to different sources of interference. In an embodiment, the control unit as for instance described above can thus utilize instructions that lead to a controlling such that the audio sensing uses an audio wavelength similar or vastly different than the wavelength used by the radiofrequency sensing. Such instructions can thus refer to a deliberate orchestration of the audio sensing and radiofrequency sensing, in particular, with respect to the used wavelengths, to be applied in a given situation. Such an orchestration can, for instance, both minimize interference from external noise sources and enrich the sensing-signal diversity and thereby enhance the accuracy of the hybrid context awareness sensing system. Exemplarily such instructions can be utilized in situations in which a double-checking of the sensing results between the two sensing modalities is desired, e.g. for estimating the size of an object, like is it has to be differentiated between a child and an adult.

As described above, for controlling the sensing modalities in dependency from each other several parameters, i.e. context parameters, can be taken into account, for instance, when choosing an instructions referring to an orchestration of the audio-sensing wavelength and the radiofrequency sensing wavelength. The context parameters can refer, for example, to a) a frequency-dependent transmission range of the radiofrequency sensing and audio sensing signals, respectively, b) a respective spatial confinement of the radiofrequency and audio sensing signal, e.g. using shorter radiofrequency wavelength results in the sensing to be more directional/confined, c) a currently available/allowable radio- and audio wavelengths, for instance, due to hardware constrictions, audio/wireless noise interference and other real-time application constraints, d) a currently available/allowable radio- and audio messaging rate, whereas the messaging rate is determined by wireless congestion, missed-message rate, power consumption and real-time application constraints such as unobtrusive embedding of audio sensing signals in the background music, e) an accuracy of the audio- and radiofrequency signal arrival angle detection for a pair of network devices monitoring a specific area within the room for the currently chosen sensing wavelengths, respectively, for instance, for a first detection zone, the angel of arrival detection with the chosen radiofrequency-sensing wavelength may enable less precise localization of a subject, while audio beamforming may allow for a more accurate and faster positioning or tracking, or f) a physical dimension of a to-be-traced subject, e.g. forklift vs person.

In an embodiment, the control unit can be adapted to utilize instructions for the controlling of the orchestration between radiofrequency and audio sensing that evolve over time depending on the context parameters. For instance, the room's context parameters, e.g. referring to the room as a hospital room, can at first indicate to utilized instructions that only allow for a very low dB audio level signal materially inaudible to an human occupant and hence restricting the applied audio sensing tone. This restriction will result in audio-sensing only being able to deliver rather inaccurate breathing detection.

Ultrasound at sufficient sound pressure levels can cause hearing damage in humans even if it cannot be heard. Even a device designed to be safe for humans may cause nuisance or harm to pets and other animals due to their extended range of hearing. For ultrasound devices emitting airborne ultrasound the auditory and subjective risks are the most relevant. Safety standards and guidelines have been developed with the goal of protecting against hearing damage in humans. Audio sensing will cause humans and animals to be exposed to ultrasound for longer durations than previously considered.

Hence, it is desired that the inaudible audio sensing solution considers the hearable sound and ultrasound perception and safety in humans and animals, when the audio sensing selects the sound pressure levels and length of duration of administering the audio sensing sound levels. Specifically, the instructions used for inaudible audio sensing can limit the audio sensing sound pressure depending on the current position of the human with respect to the audio sensing transmitter as well as the presence and location of animals in the room.

In this case, the instruction can indicate a controlling of the sensing modalities such that the radiofrequency sensing nodes, i.e. network devices, utilize mm-wave WiFi to perform breathing and fall detection, albeit covering with the radiofrequency sensing only a small portion of the room due to the confined nature of mm-wave WiFi sensing signals, wherein at the same moment the audio sensing is controlled to choose an audio wavelength well suited to perform coarse motion detection at the full room level to eliminate the motion detection blind spots left by the mm-wave WiFi sensing. If after a while a change in the room's context parameter suddenly allows for human-audible audio sensing, for instance, since the context parameter indicate that a person in the room is listening to music, the control unit can adapt the utilized instructions such that the breathing detection task is assigned to the audio sensing network devices and the radiofrequency sensing network devices switch to 5 GHz WiFi that is well suited to perform coarse motion detection at the full room level. The audio sensing network devices can then be controlled to select audio sensing wavelengths which are optimal for tracking the breathing motion of an individual. Moreover, in an embodiment the control unit can be adapted to utilize instructions that lead to an initiation of an audio sensing change after radiofrequency sensing results indicate a fall, i.e. imply that an elderly person may be now lying on the floor. In particular, based on this result, the audio sensing system can be controlled, as indicated by the instructions, to switch to a highly audible, intrusive audio sensing signal, e.g. a linear increase in the emitted audio frequency over 100 ms from 20 Hz to 16 KHz, that enables the audio sensing to perform high-accuracy breathing detection and precision-location of the height of the chest and thereby deduce whether the elderly is really lying on the floor. Further, in such an embodiment, the apparatus can also be adapted to ask a user, for instance, via audio speaker of the network devices to provide feedback via a gesture which is sensed by the audio- and/or radiofrequency sensing modality. In an embodiment, the instructions can also indicate, for example, to tune the sensing modalities, to occasionally perform an elaborate, partially audible audio-sensing calibration scan even if the context parameters indicate the presence of people, e.g. the audible calibration can last less than 2 s. For instance, the instructions can refer to using such an audio scan at times when the context parameters of a room indicate that the person will not be annoyed by the audible noise, e.g. when the audio-sensing calibration just comprise a couple of additional audio sensing beeps at the end of every public-service-announcement message via the intercom.

In an embodiment the context parameter can also be indicative of occurring mechanical vibrations of a network device, for instance, being a luminaire that can, for example, swing in the wind, or influences by mechanical work in the environment. Such mechanical vibrations can be especially diametral for fine grained radiofrequency sensing, e.g. breathing detection. To minimize the negative impact of vibrations on the sensing performance, the instructions corresponding to such situations indicated by respective context parameters, can refer to a switching or adjust of at least one of the sensing wavelengths of at least one of the sensing modalities such that the updated sensing wavelength is substantially longer than the current physical oscillation of the network device.

Certain wireless protocols such BLE or WiFi sequentially hop through different radiofrequency channels, for instance, of a predefined set of frequency channels, to avoid wireless interference. Generally, presently available WiFi/BLE radio stacks can be utilized to allow for a purposefully orchestration of the frequency hopping to optimize the radiofrequency sensing performance. In an embodiment, the orchestration of the sensing modalities can thus refer to a coordination of the radiofrequency sensing and audio sensing such that the frequency hopping of the audio sensing and the frequency hopping of the radiofrequency sensing system are purposefully coordinated and synchronized. Compared to just independently running two independent frequency-hopping schemes for radiofrequency sensing and audio sensing in parallel, this orchestration ensures that the sensing modalities will deliver reproducible performance compared to an uncoordinated frequency hopping which will continuously yield different permutations of BLE sensing wavelength and audio sensing wavelengths. Hence, synchronizing the time-series of the applied respective audio- and radiofrequency-wavelengths will, for instance, enable machine learning sensing AI algorithms that can be utilized for one or both sensing modalities to be better trained and hence improve the performance of the sensing system. In the simplest implementation, in this embodiment the audio sensing can be controlled to utilize on purpose the identical sequence of audio wavelengths as the frequency hopping radiofrequency sensing modality. For example, in a simple case the radiofrequency sensing modality performs a single hop from 2.4 GHz referring to a wavelength of 12.5 cm to 5 GHz referring to a wavelength of 6 cm. In this case the audio sensing modality will be controlled accordingly to hop from a first 2.8 kHz audio tone referring to a wavelength of 12.5 cm to a second 5.7 kHz audio tone referring to a wavelength of 6 cm. Using at any given moment the same wavelength for both the audio sensing and radiofrequency sensing ensures that the respective audio and radiofrequency waves interact with objects of similar sizes. Thus, both the audio and wireless sensing signals are for instance predominantly interacting with a to-be-tracked robot in a warehouse but not with other smaller objects also present in the space.

In an embodiment, the instructions can also refer to an orchestration for dynamically coordinating the sensing wavelengths of the two sensing modalities. This instructions can, in particular, be applied when the context parameters indicate that a lot of ambient noise is present in a room. For instance in a conference room during an cocktail reception, audio sensing may temporarily only be able to utilize a first audio wavelength which is reasonably free of audio interference, e.g. 2.8 kHz, while a second audio wavelength may suffer from major audio interference, e.g. 5.7 kHz. The controlling unit can then control the radiofrequency sensing based on the instructions to switch to the same new wavelength selected for the audio sensing.

In an embodiment, the orchestration of the respectively chosen audio- and radiofrequency sensing can also take a bleeding of audio sensing signals and/or wireless sensing signals into adjacent rooms into account. For instance, if utilizing audible audio-sensing frequencies is acceptable given the current context parameter of a first room, the audio sensing signal may still leak through a door to a second room, especially if a low frequency audio signal is chosen. In this case the control unit can be adapted to control the audio sensing to utilize shorter wavelengths in order to avoid disturbing the second room. While diffraction may cause the sound sensing signals to leak into a second room, diffraction actually may be beneficial to a sensing performance within the first room. For instance, diffraction can bend the audio sensing signals around a corner to reach a hidden outmost area of the room far away from the sensing network devices. Thus, in an embodiment, the control unit can utilize instructions that refer to an orchestration that determines when to employ an audio sensing signal with a high degree of the diffractive ability, for instance, when to increase a wavelength of the utilized audio sensing signals. In particular, wavelengths longer than a typical dimension of an object in the room enable the sound sensing to both travel across longer distances and/or to transverse also a highly cluttered space as the long-wavelength sensing signals are able to diffract nicely around any physical obstructions in its path.

Generally, audio signals reflected at an object with a "rough" surface tend to be diffuse by the rough surface, wherein "rough" is in this context defined as a surface comprising structures with a similar scale as the incident wavelength. Such a diffusion on rough surfaces leads to a less sharply confined audio sensing zone since the incoming sound is reflected by the rough surface in a wide variety of directions. In an embodiment, the controlling unit can thus be adapted to utilize instructions that determine a selection of an audio sensing wavelength based on context parameter indicating a rough surface in a room such that an interaction with the rough surface, for instance, at a heating radiator or an industrial machine in a plant, is minimized.

Similarly, a topography of a surface determines how much of a sensing signal is absorbed by the object. For a nonporous surface, such as smooth concrete, acoustical energy will reflect off the surface with little loss of acoustical energy and hence provide a well energized audio multipath signal. However, if the surface is porous, such as a fiber batting, acoustical energy will penetrate the surface and scatter among the pores and interact and reflect off the fibers. Scattering among the fibers and pores results in frictional losses resulting in conversion of the acoustical energy into heat and an attenuation of the audio sensing signal. Hence, whenever a substantial portion of audio sensing signals are absorbed by a porous surface, a specific set of multipaths in the room is deenergized. Thus, it is preferred that if context parameters indicate such a situation, the control unit is adapted to utilize instructions that allow to mitigate this effect by either controlling the audio sensing such that certain audio sensing wavelengths are utilized that are not influenced by the absorption or that determines to control the radiofrequency sensing such that for respective portions of the room, i.e. sensing area, only the radiofrequency sensing results are determined as being trustworthy, since the wireless radiofrequency signals are absorbed less.

Generally, for more advanced sensing applications such as localization or breathing detection, it is advantageous to employ active beam steering, which preferentially sends the sensing signal in certain spatial directions. For instance, audio sensing can employ both audio transmit beamforming, for example, via a directional speaker, and/or audio receive beamforming, for example, via a directional microphone array. Similarly, modern WiFi radios are capable to perform transmit-beamforming as well as receive-beam forming utilizing an antenna array. Such exemplary hardware utilized in the sensing modalities allows even for both radiofrequency sensing and audio sensing to use sensing beams swiveling across a sensing area, for instance, to count the people present within a space. Thus, in an embodiment, it is preferred, that the control unit is adapted to utilize instructions that determine a coordination between the audio sensing and radiofrequency sensing modalities with respect to their respective beam-steering directions as well as the chosen respective spatial confinement of their respective sensing signals, e.g. with respect to a beam cross section, divergence, etc. This coordination can determine a modification of the chosen wavelengths as well as a conscious manipulation of the transmit/receive characteristics of the antennas/speaker/microphone array of the respective network devices. In this way, both the radiofrequency sensing and the audio sensing are focused at any given time towards the same spot in the sensing area, which will improve the performance of the sensing as the two sensing modalities can directly, i.e. 1:1, compare their respectively acquired time-series sensor data, as they concurrently observed the same spot in the room at the same moment in time. Preferably, in this case the control unit is adapted to control the sensing modalities to utilize audio- and radiofrequency-sensing frequencies which result in a similar spatial confinement of the respective sensing signals.

In an embodiment, since the audio-sensing hardware is generally super flexible regarding the choice of its audio wavelength, the control unit can be adapted to utilize instructions that determine an audio wavelength which is vastly different to the WiFi/ZigBee wavelength utilized by the radiofrequency sensing system.

Moreover, in an embodiment, the radiofrequency sensing can be adapted employ a sensing algorithm analyzing a combination of Doppler shifts, e.g. caused by a walking person, as well as micro-Doppler shifts generated by a complex body, e.g. micro-Doppler from complexly moving legs and arms attached to the human torso. In this case it is preferred that the controlling of the sensing modalities is based on instructions that determine a audio sensing wavelength depending on a Doppler signature reported by the radiofrequency Doppler sensing, wherein in this case the Doppler signature can be regarded as part of the context parameters. For instance, if the radiofrequency Doppler sensing has detected a micro Doppler effect indicative of hand movement but is not able on its own to resolve finger movements, the audio sensing can be controlled to employ a set of audio wavelengths comprising both a first wavelength which is the same wavelength used by radiofrequency sensing as well as a shorter second audio wavelength capable to also resolve minute finger movements. The finger movements may for instance provide additional context information, for instance, whether the person is typing and at which speed the person is typing, e.g. browsing the internet vs writing an article.

In particular, the above described embodiments show that fusing of purposefully highly-orchestrated radiofrequency sensing and audio sensing will provide a more efficient way to detect the presence of persons, track persons in a building, monitor breathing and daily activities as well as detecting fall accidents. In the following a detailed preferred embodiment for a specific application of the apparatus described already above, will be described.

Elderly care, both at home or in retirement communities, is an urgent matter for our society. Technologies that assist the elderly in independent living are essential for enhancing care in a cost-effective and reliable manner. The recent Covid-19 pandemic caused many lives in nursing homes. In this situation assistance to provide contactless care and monitoring is essential to avoid contacts and block the spread. Cost-efficient, though sufficiently accurate context awareness sensing is also desired for non-residential venues. Many applications for elderly care or COVID-risk-mitigation systems for commercial offices demand real-time observation of the environment and the resident's activities using an event-driven system. On the other hand, end-user acceptance of current-state-of-the-art sensors such as video cameras is an uphill battle, as cameras can easily be perceived as intrusive by the elderly. Similarly, in retail and hospitality applications, especially in the US, owners of a venue regularly are faced with high costs due to fake lawsuits of people claiming an injury due to a fall to the ground. Hence, big-box retailers such as The Home Depot recently installed in all stores video surveillance to help them to distinguish between real fall events and suspicious fall claims which warrant a deeper investigation. While such cameras may be acceptable for big-box retail, they are certainly undesired in hospitality venues such as restaurants. In addition, the high cost of streaming cameras makes them prohibitive for most small entity retailers.

Thus, it is proposed to utilize the above described principles of the invention to allow for a richer activity tracking as well as for fall detection. Generally, for instance, commonly used ZigBee radiofrequency sensing is good at presence detection but has difficulties when locating the people. Audio sensing on the other hand can locate the people by varying the audio sensing wavelength, but is subject to interference from noise originating, for instance, from HVACs, fans, etc. Thus, in an embodiment the apparatus is utilized with a network provided in the context of a Retail/Hospitality/Elderly Care Facility. In particular, it is preferred that multiple luminaire comprising embedded sensors in the ceiling are utilized as network devices. For example, modern retail or office or elderly care spaces often feature already a multitude of such luminaires in form of a luminaire network, wherein the sensors of the luminaires can comprise both a wireless radio as well as a microphone. This already present lighting infrastructure can then also be utilized to concurrently perform audio sensing as well as radiofrequency sensing and in this way ensure seamless sensing coverage for the whole building. Thus, the above described apparatus allows for a controlling of the two sensing modalities that allows for an iterative fusion between the audio sensing and the radiofrequency sensing. Preferably, the control unit is adapted for this application to utilize the following instructions for controlling the sensing modalities. The instructions refer to adapting the radiofrequency sensing such that the presence of people can be detected, for instance, with 2.4 GHz radio sensing, due to its larger spatial coverage compared to the inaudible audio signals. The results of the radiofrequency sensing can then be provided by the context parameter providing unit as context parameters. In particular, it is preferred that the sensing result indicates already a rough location of people detected in a sensing area. Generally, the radiofrequency sensing, due to an adjustable radiofrequency transmission power without disturbing people, has a larger sensing range compared to audio sensing. So, once the radiofrequency sensing system has identified the whereabouts of people and provided the result indicating a part of the sensing area in which the people are located the control unit is preferably adapted to select a certain sub-set of audio transmitter and receivers, for instance, of respective network devices, that are than adapted to perform a precision-tracking of the persons pre-identified by the radiofrequency sensing system. The audio sensing system can for instance, be adapted to extract the respiration signal from a time series audio sensing signal quality parameter. Preferably, the control unit is adapted to control the audio sensing to use FWCW signals to locally monitor activities and detect accidents by widely varying audio sensing frequencies. In particular, it is further preferred that the control unit is adapted to control the audio-sensing and the radiofrequency sensing such that they are actively "tuned in" based on each other's results. In particular, such that both sensing modalities work concurrently and enforce each other. For example, depending on the chosen audio frequency, the audio sensing signals may or may not be perceived obtrusive by humans occupying the space. If human-perceivable audio signals are used, it is preferred to control the audio sensing such to embed audible audio sensing signals into a soothing white noise or in a music soundscape, for instance, commonly used in a hospitality or retail. Near-ultrasonic audio sensing frequencies can, for example, be intermixed in pop-music, so that the near-ultrasonic sound sensing signals are aligned with spikes in the amplitude of the pop song. Moreover, the audio sensing signals, for instance, ping signals, can be deliberately embedded in active sound masking systems, for instance, used for suppressing intelligible speech in office applications. Optionally, the detected audio-sensing information can be fed to a utilized radio sensing algorithm for online training of the algorithm such that the two sensing modality results will eventually converge with enough data for presence detection. In this case, it is preferred to use a Bayesian fusion of the audio sensing and radiofrequency sensing results to improve an accuracy of the sensing, specifically for fall detection.

In an embodiment, especially suitable in this context, it is preferred that the control unit is adapted to control the audio sensing such that the audio sensing wavelength is varied for intrusive or non-intrusive audio sensing. Such an audio spectrum swipe enables the audio sensing to search the space for humans and measure distance and detect accidents, like a fall, etc. Optionally, the apparatus can be adapted to share sensing knowledge, for example, in form of respective instructions, with other apparatuses across rooms with similar layouts, e.g. for senior living or nursing homes. For example, a room layout similarity can be determined based on audio sensing results combined with meta data.

Generally, low wavelength audio signals attenuate slower than higher wavelength audio signals. Hence, audio sensing using sensing signals with a lower wavelength has a wider sensing range. Moreover, while audio sensing using higher wavelength can only sense in a direct line of sight and can thus be blocked easily, audio sensing signals with a lower wavelength are diffracted around corners and hence can be utilized to sense beyond blocking objects. Hence, in an embodiment it is preferred, that if the context parameter indicate, for instance, based on a radiofrequency sensing of the environment, that a blocking object is present in the sensing are, e.g. an order picking robot in an warehouse, the controlling unit can be adapted to lower a frequency of the audio sensing signals, for instance, based on the indicated size of the object, to sense also behind the object.

In a preferred embodiment the controlling unit is adapted to control the network to perform audio sensing only, radio sensing only, or a combination of both depending on the context parameters referring, for instance, to the network environment, a room type, interference characteristics, etc., e.g. if a room is too audio-noisy, or a microwave oven is on.

Figure 3:
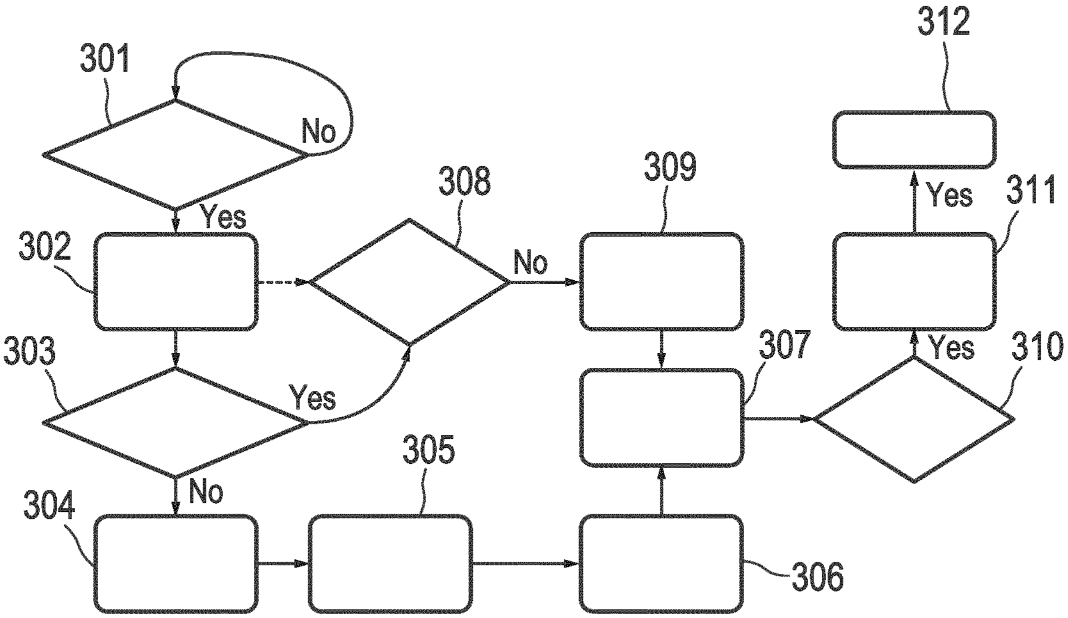
FIG. 3 shows schematically and exemplarily a flow chart of an exemplarily configuration of the audio and radiofrequency sensing of the network.

FIG. 3 shows a schematic and exemplary block diagram of a detailed example for a controlling of the audio sensing and radiofrequency sensing for presence and fall detection. In this approach, in a first step 301 radiofrequency transceivers embedded in the network devices, preferably being luminaires, are used to detect the presence of a person. Alternatively, a PIR sensor, whose range is about 3-5 m depending on the height of the sensor, can be used to report the presence of the person in the space. As radiofrequency signals usually have a better coverage than audio signals, this first step is to detect the part of the sensing area currently occupied by people. As next step 302, the network devices in the reported occupied parts, including the speakers and microphone arrays embedded in the network devices, are controlled to activate the audio sensing. The network devices can be controlled to emit the audio waveforms and use transmit or receive beamforming to scan the occupied parts to detect the number of people and their locations. If no people are detected by audio sensing, but radiofrequency sensing reports presence, the audio sensing can be controlled to perform an elaborate frequency scan of the zone, for instance, by changing the audio sensing wavelength of 1.7 cm at 20 KHz to 17 m at 20 Hz, to establish a reliable ground truth for both sensing modalities. The information of the number of people and their locations can then be provided as part of the context parameters and is used then for further controlling the radiofrequency sensing, for instance, by training or amending the radiofrequency sensing algorithm to improve the presence detection and even extend the radiofrequency sensing algorithm towards people counting. If there are discrepancy for presence detection between audio and radiofrequency sensing, the audio sensing can be controlled to use a different audio band to confirm the presence. The confirmed results can then be used again as context parameters to control the radiofrequency sensing in subsequent radiofrequency sensing scans to find the previously missed person, and upon having successfully identified the person to update its configuration parameters. For the audio sensing transmitter, for example, a simple audio speaker embedded in a controller, like a wall switch or a downlight with Amazon Alexa, can be used. The speaker can be controlled to emit a white audio noise or a FMCW audio signal for detecting the persons in step 304, if in step 303 it has been determined that no audio noise is interfering with the audio sensing. The audio sensing may employ audible or non-audible frequencies, for instance 17 kHz, i.e. wavelength of 2 cm, or 170 Hz, i.e. wavelength of 2 m. Either wavelength will be quite difference from ZigBee wavelength around 12.5 cm, i.e. 2.4 GHz. Optionally, in step 304 a directional audio speaker can be controlled to aim the audio sensing signals specifically towards the area of interest identified by the radiofrequency sensing, wherein the directional audio signal will reduce the audio interference of other areas of the room. Subsequently, in step 305 based on the results of the audio sensing the control unit can configure the microphone arrays embedded in a the network devices to use their directional microphones to listen only towards the specific occupied areas, for instance, as identified before by the radiofrequency sensing, to precision track the person with audio sensing. Specifically, the microphone array can be controlled to scan the space to search the signal with respiration rate to track the person.

Generally, human body mass is known to absorb sound. Hence, due to the presence of the person in the space, the channel state information (CSI) in the direction of the person will significantly change. Assuming we have M speakers and N network devices, i.e. receivers, the signal can be modeled as shown below with CSI $\{H_{i,j}\}$, $$\begin{bmatrix} y_0(t) \\ \dots \\ y_{N\text{-}1}(t) \end{bmatrix} = \begin{bmatrix} h_{0,0} & \dots & h_{0,M\text{-}1} \\ \dots & \dots & \dots \\ h_{N\text{-}1,0} & \dots & h_{N-1,M-1} \end{bmatrix} \begin{bmatrix} x_0(t) \\ \dots \\ x_{M\text{-}1}(t) \end{bmatrix} + \begin{bmatrix} n_0(t) \\ \dots \\ n_{M\text{-}1}(t) \end{bmatrix}.$$

Thus, in step 306 the audio sensing can be controlled, for instance, by amending a respective sensing algorithm to utilize the CSI of the received signals for fall detection.

If it is determined in step 303 that the audio noise is too high in step 308 it can be determined if radio interferences are also present or if radiofrequency sensing is possible. If radiofrequency sensing is possible the radiofrequency sensing can be controlled in step 309 to perform fall detection utilizing the CSI of the radiofrequency signals for fall detection. Generally, the radiofrequency sensing and audio sensing as described above can be performed also concurrently, if the noise in the respective modality is not too high for a sensible sensing accuracy. In this case, in step 307 the sensing results of both modalities can be fused, for instance, based on predetermined rules, or a Bayesian fusion model using respective probabilities for each sensing result.

After a fall has been detected in step 310, both sensing modalities can be controlled to perform a close monitoring. Specifically, the microphone array can be controlled to detect via audio sensing the respiration rate to confirm the detected accident in step 311. If generally no or only minimum activities are detected for more than a few minutes, an emergency call can in step 312 be used to handle this situation. Moreover, since the network includes both an audio speaker and a microphone, the network can "talk to" the caregiver to confirm, for instance, when a fall is detected.

Generally, in the above examples, the audio sensing and the radiofrequency sensing are controlled such that they are actively tuned in based on each other's sensing results. Thus, in the above embodiments, both sensing modalities work concurrently and enforce each other.

Further preferred details of the two sensing modalities are described in the following. With respect to the radiofrequency sensing it is preferred, for instance, when using WiFi that a network device can act as both a transmitter and receiver. In this case, it is preferred that multiple network devices are utilized in order to meet detection accuracy requirements. Moreover, it is preferred that the audio sensing is controlled to utilize non-obtrusive audio signals to human, i.e. signals with a frequency above 16 KHz, for tracking purposes, but to utilize obstructive audio sensing signals to confirm if an accident is detected. The obtrusive audio signals allow the audio sensing to use higher audio bandwidth, hence enabling higher-quality detection.

In one specific embodiment, it is preferred to control the audio sensing to embed the audio sensing signals into a soothing white noise signal. Similarly, the audio sensing's ping messages can be hidden in an acceptable music, e.g. music soundscape used in hospitality or big-box retail. The audio sensing ping signals can also be deliberately embedded in active sound masking systems. Moreover, a series of orthogonal sequences of audio sensing signals can also be used in a time order to provide timing information, which could also help to determine the spatial positioning of a human in a room. In particular, it is noted that the microphones and the speakers transmitting the audio signals are preferably not synchronized as they are preferably not co-located. Preferably, the audio sensing is controlled to transmit a beaconing signal, for instance, a radiofrequency signals over the network using BLE, ZigBee, or PoE, from an audio-sensing master network device to synchronize the start and stop for the audio sensing. However, since a wireless or wired network can already provide a synchronous network clock, also global time stamps can be utilized to define a start and stop time for all of the audio sensing network devices within a detection area. Optionally, the control unit can be adapted to control the sensing modalities such that the sensing area is divided up into a first set of sensing zones which can be optimally served by the radiofrequency sensing and second sensing zones better served by the audio sensing. In particular, the sensing zones can be divided and assigned based in context parameters, since depending on its building materials, shape and room size, each sub-space in a building can provide different challenges for radiofrequency sensing signals and audio sensing signals, respectively. Hence the building space can also be divided up by the control unit, for instance, by using predetermined decision criteria, into a first set of sensing zones which can be optimally served by the radiofrequency sensing and a second set of sensing zones which is currently better served by the audio sensing. In the zones well covered by the audio sensing, the radiofrequency sensing can be controlled to refer to a "basic" radiofrequency sensing. However, also in this case, if the context parameters for instance, including sensing result of any of the sensing modalities, indicate the presence of a person, the control unit can be adapted to control again both sensing modalities to be used in concert in the vicinity of the person. For example, if an area generates a lot of audio ambient noise but the area is relatively small, such as a kitchen, radiofrequency sensing can be the first choice as the ambient audio noise may impact the audio sensing performance. However, in an area with strong wireless interference or much wireless traffic, audio sensing can be the first choice. For zones which both are well-covered by the audio sensing and are even tolerant to the audible nuisance of the audio sensing signal, the radiofrequency sensing can be controlled to be scaled back to basic radiofrequency sensing that is generally less wireless bandwidth consuming and the audio sensing can be controlled to perform a highly-granular sensing. However, if in a small room a lot of ambient noise is present, such as a conference room during an cocktail reception, radiofrequency sensing can be controlled to act as the primary sensing modality, since the reception's ambient audio noise may impact the audio sensing performance. In addition, the scaled-back audio sensing can be controlled to use only those audio frequencies which are reasonably free of audio interference. However, in another room of the building currently experiencing strong wireless interference or wireless traffic congestion, audio sensing may be the first choice. Optionally, the radiofrequency sensing and audio sensing zones can be semi-overlapping/interleafed in the sensing area to create distance between neighboring zones utilizing the same sensing modality.

Generally, audio sensing can be configured to filter out certain distances based on the audio time-of-flight delay, e.g. for disregarding any reflected audio sensing signals arriving between 1.5 m to 3 m range from a speaker. This makes it, for instance, possible to exclude a certain corridor within an open plan office from triggering an occupied status of a nearby group of desks. However, this possibility is preferably used with a synchronized network clock such that it is most easily achieved by placing both the audio transmitter and receiver in the same physical unit, i.e. network device. The delay in the audio echo can then be easily measured by using a self-orthogonal waveform with good auto correlation. Thus, controlling the audio sensing to use this possibility can complement the capabilities of radiofrequency sensing, for instance, using Zigbee, which can be based on RSSI and thus lacks ranging capabilities.

Generally, if in the above described embodiments, situations, like specific activities, room usages, room characteristics, etc. are described, these sensing situations can be inferred from respective context parameters, for instance, from sensing results of any one of the modalities, information on the room, a time of day, object location and sizes, etc. The concurrently described controlling strategies can then be provided in form of controlling instructions corresponding to the respective sensing situation and/or context parameters. These instructions can then be stored on a respective storage and utilized by the control unit based on the respective context parameters when controlling the sensing modalities based on the respective context parameters. Thus, even if not mentioned in all embodiments explicitly, the controlling is based on the respective context parameters that indicate the sensing situation that corresponds to the respective instructions used for controlling. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of the context parameters or the controlling of the radiofrequency and audio sensing, etc., performed by one or several units or devices can be performed by any other number of units or devices. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an apparatus for controlling radiofrequency sensing and audio sensing of a network. The network comprises a plurality of network devices, e.g. smart lights, and is adapted to perform radiofrequency sensing and audio sensing utilizing one or more of the network devices. A context parameter providing unit provides context parameters, wherein the context parameters are indicative of a context in which the radiofrequency sensing and the audio sensing is performed. A controlling unit controls the radiofrequency sensing and the audio sensing of the network in dependency of each other based on the context parameters. This allows for an improved monitoring of an area.

The invention claimed is:

1. An apparatus for controlling radiofrequency sensing and audio sensing of a network, wherein the network has a plurality of network devices, and wherein the network is adapted to perform radiofrequency sensing and audio sensing utilizing one or more of the network devices, the apparatus comprising:

a context parameter providing unit for providing context parameters, the context parameters being indicative of a context in which the radiofrequency sensing and the audio sensing is performed, and a controlling unit for controlling the radiofrequency sensing and the audio sensing of the network in dependency of each other based on the context parameters, the controlling of the radiofrequency and the audio sensing performed in dependency of each other refers to a controlling based on functional relations between changes in sensing parameters of the radiofrequency sensing and the audio sensing;

wherein the controlling unit is adapted to apply predetermined instructions that define a specific orchestration of the radiofrequency sensing and the audio sensing of the network based on the context parameters, the specific orchestration refers to a specific controlling of sensing parameters utilized for the radiofrequency sensing and the audio sensing of the network in dependency of each other, an orchestration refers to the application of interrelated instructions with respect to the radiofrequency sensing and the audio sensing, and said interrelated instructions indicate a controlling relationship between certain sensing parameters of the radiofrequency sensing and the audio sensing such that when one of these sensing parameters is changed or adapted also the respective related sensing parameter is also changed or adapted according to the controlling relationship; and wherein the instructions include as specific orchestration adapting the wavelength of audio signals utilized for the audio sensing to be similar to the wavelength of the radiofrequency signals utilized for radiofrequency sensing when the context parameters indicate a predetermined current sensing situation that requires an increase of the sensing accuracy.

2. The apparatus according to claim 1, wherein the context parameters are indicative of a current sensing situation referring to at least one of a frequency dependent transmission range of audio and/or radiofrequency signals of one or more network devices, a spatial confinement of the audio and/or radiofrequency signals, at least one physical dimension of a to be sensed subject, a possible and/or allowable radiofrequency and/or audio frequency range provided by one or more of the network devices, an allowable nonaudible sound pressure dose and current or expected presence, absence or constellation of one or more subjects in a sensing area of the network.

3. The apparatus according to claim 1, wherein the instructions include a specific orchestration adapting the wavelength of audio signals utilized for the audio sensing to be different from the wavelength of the radiofrequency signals utilized for radiofrequency sensing, when the context parameters indicate a predetermined current sensing situation that requires an increase in the sensing diversity.

4. The apparatus according claim 3, wherein the instructions include as specific orchestration coordinating a wavelength hopping of audio signals utilized for the audio sensing with a wavelength hopping of the radiofrequency signals utilized for radiofrequency sensing, when the context parameters indicate a predetermined current sensing situation with an environmental audio and/or radiofrequency noise above a predetermined threshold and/or when the context parameters indicate a predetermined current sensing situation that requires an increase of the sensing accuracy.

5. The apparatus according to claim 4, wherein the coordination of the wavelength hopping refers to a synchronization of the wavelength hopping of audio signals utilized for the audio sensing with the wavelength hopping of the radiofrequency signals utilized for radiofrequency sensing in the time domain.

6. The apparatus according to claim 1, wherein the specific orchestration can further include coordinating a beam steering of the audio signals utilized for the audio sensing with a beam steering of the radiofrequency signals utilized for radiofrequency sensing such that both the radiofrequency sensing and the audio sensing is performed with respect to the same sensing area at the same time.

7. The apparatus according to claim 1, wherein the instructions include as specific orchestration performing audio sensing with a higher spatial resolution than the radiofrequency sensing, when the context parameters indicate an occurrence of a fall in the context of a fall detection or when the context parameters indicate an occurrence of a gesture in the context of a gesture detection.

8. The apparatus according to claim 1, wherein the controlling of the audio sensing comprises filtering out parts of the audio sensing signal based on the context parameters, wherein the audio sensing is performed based on the filtered audio sensing signals.

9. The apparatus according to claim 1, wherein for applications that more than one sensing task is desired to perform by the sensing network, the controlling comprises assigning the radiofrequency sensing and the audio sensing to different sensing tasks based on the context parameter and adapting the radiofrequency sensing and the audio sensing to the respective assigned tasks.

10. The apparatus according to claim 1, wherein the controlling comprises assigning the radiofrequency sensing and the audio sensing to different parts of a sensing area based on the context parameter and adapting the radiofrequency sensing and the audio sensing to perform the respective sensing in the assigned part.

11. A network comprising:

a plurality of network devices adapted to enable the network to perform radiofrequency sensing and audio sensing in a sensing area concurrently, an apparatus according to claim 1.

12. A method for controlling radiofrequency sensing and audio sensing of a network, wherein the network has a plurality of network devices, and the network is adapted to perform radiofrequency sensing and audio sensing utilizing one or more of the network devices, the method comprising:

providing context parameters, the context parameters being indicative of a context in which the radiofrequency sensing and the audio sensing is performed;

controlling the radiofrequency sensing and the audio sensing of the network in dependency of each other based on the context parameters, the controlling of the radiofrequency and the audio sensing performed in dependency of each other referring to a controlling based on functional relations between changes in sensing parameters of the radiofrequency sensing and the audio sensing;

applying predetermined instructions that define a specific orchestration of the radiofrequency sensing and the audio sensing of the network based on the context parameters, the specific orchestration referring to a specific controlling of sensing parameters utilized for the radiofrequency sensing and the audio sensing of the network in dependency of each other, an orchestration referring to the application of interrelated instructions with respect to the radiofrequency sensing and the audio sensing, said interrelated instructions indicating a controlling relationship between certain sensing parameters of the radiofrequency sensing and the audio sensing such that when one of these sensing parameters is changed or adapted also the respective related sensing parameter is also changed or adapted according to the controlling relationship, and the instructions including as specific orchestration adapting the wavelength of audio signals utilized for the audio sensing to be similar to the wavelength of the radiofrequency signals utilized for radiofrequency sensing when the context parameters indicate a predetermined current sensing situation that requires an increase of the sensing accuracy.

13. A non-transitory computer readable medium comprising computer program code to perform the method of claim 12 when run on one or more processors.

* * * * *